June 5, 1928. Re. 16,986

J. L. BANKS

MUSICAL INSTRUMENT

Original Filed July 19. 1922 2 Sheets-Sheet 1

Inventor

JOSEPH LEROY BANKS,

By Spear, Middleton, Donaldson & Hall

Attorneys

June 5, 1928. Re. 16,986

J. L. BANKS

MUSICAL INSTRUMENT

Original Filed July 19. 1922 2 Sheets-Sheet 2

Inventor

JOSEPH LEROY BANKS,

By Spear, Middleton, Donaldson & Hall

Attorneys

Reissued June 5, 1928.

Re. 16,986

UNITED STATES PATENT OFFICE.

JOSEPH LE ROY BANKS, OF BALTIMORE, MARYLAND.

MUSICAL INSTRUMENT.

Original No. 1,560,497, dated November 3, 1925, Serial No. 576,145, filed July 19, 1922. Application for reissue filed November 3, 1927. Serial No. 230,902.

My invention relates to improvements in musical instruments the objects of which are to provide—a new article of manufacture; 2nd, to provide a musical instrument with a means for controlling the tones; 3rd, to provide musical instruments with a note control playing attachment; 4th, to provide mouth blown musical instruments with automatically playing attachments; 5th, to provide a player instrument with a detachable musical instrument; 6th, to provide a means for packing the musical instrument to a tracker-bar; 7th, to provide a tracker-bar whereby the playing attachment is secured to the musical instrument; to provide a tracker-bar whereby the playing attachment is detachably secured to the musical instrument; 8th, to provide a tracker-bar whereby the musical instrument is detachably secured to the note controlling means; 9th, to provide a player instrument with a detachable note controlling means; 10th, to provide a tracker-bar with brackets for supporting a note controlling means, 11th, to provide a tracker-bar with means for frictionally securing a musical instrument to a notes controlling means; 12th, to provide a tracker-bar secured to a mouth-piece jointly detachable from a musical instrument; 13th, to provide means for registering the musical instrument in the tracker-bar.

Referring to the drawings,—

Referring to the drawings,—

Figure 1:
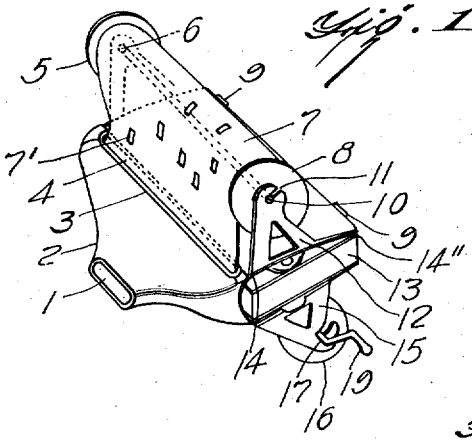
Fig. 1 is my player instrument in perspective.
Figure 2:
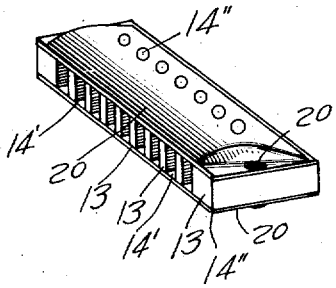
Fig. 2 is a perspective view of an harmonica or mouth-organ.
Figure 3:
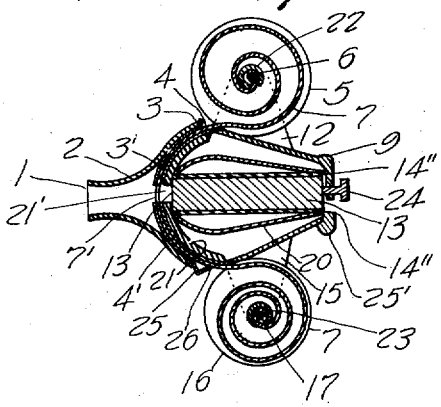
Fig. 3 is a cross section of my player instrument.
Figure 4:
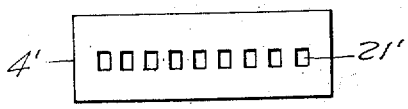
Fig. 4 is an elevation of the shield, tracker-bar, and packing.
Figure 5:
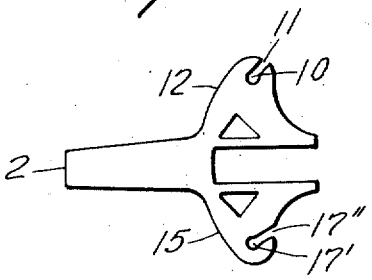
Fig. 5 is a side elevation of the mouth-piece, showing the brackets whereby the notes controlling means are held.
Figure 6:
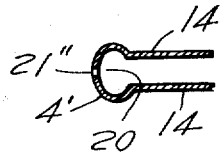
Fig. 6 is a cross secetion of the tracker-bar in modified form, illustrating how the musical instrument is inserted.
Figure 7:
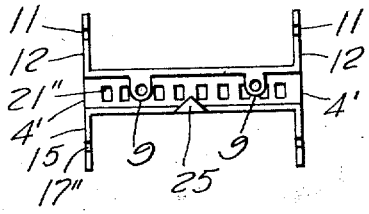
Fig. 7 is the rear end view of the tracker-bar and supporting brackets.
Figure 8:
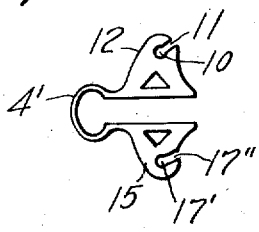
Fig. 8 is a side view of a modified form of the tracker-bar and supporting brackets for the notes controlling means.
Figure 9:
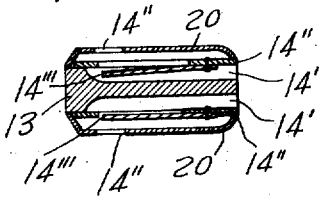
Fig. 9 is a sectional view of an harmonica musical instrument.
Figure 10:
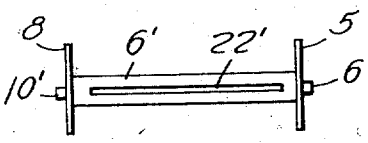
Fig. 10 is a plan view of a spool commonly used to wind up note controlling sheets or other rolled sheets.

The numeral 1 is the orifice in the mouth-piece 2, and 3 is the flared edge of the aperture 4 between the mouth-piece 2 and the tracker-bar 4′, through which the note controlling means 7 wound upon the axle 6 and secured by the clip 22 to the spool 5 and supported on the upper side of the mouth-piece 2 by the brackets 12, passes to allow the flow of air to the openings 7′ in the notes controlling means 7, thence through the openings 21″ in the tracker-bar 4′ over which the note controlling means 7 passes, and thence through the openings 21′ in the packing 21, and through the air passages 14′ to the reeds 14‴ on the reeds plates 14″ of a musical instrument.

The notes controlling means 7 then passes between the shield 3′ and the tracker-bar 4′ and out of the flared edge 25 of the orifice 26 between the mouth-piece 2 and the tracker-bar 4′ and onto the axle 17 of the spool 16 and secured to it by the clip 23. 25′ and 9 are lugs to retain the musical instrument 13 in place after inserting it; and the clamping screws 24 in the lugs 9 serve to press the musical instrument 13 against the packing 21 to prevent the air from escaping when the player instrument is being operated. 8 is the other end of the spool 5, and 10 is the bearing in the bracket 12 in which the axle 6 revolves.

The slot 11 in the bracket 12 permits the quick removal or insertion of the notes controlling means 7. Likewise 15 is a bracket on the lower side of the mouth-piece 2 and is also provided with a quick releasing slot 17″ in which the axle 17 is inserted to revolve in the bearings 17′ by the crank 18 being turned by its handle 19.

20 is the cover over the reeds plates 14″ forming the sound chamber and mouth-piece of the musical instrument 13 when used independently of my player instrument.

I may use glue or lacquer or any other material for the packing between the musical instrument and the tracker-bar.

It will be seen that the brackets supporting the note controlling means are secured to the tracker-bar as well as the mouthpiece.

I do not care to limit myself to any particular construction of my player instrument coming within the scope of the claims; nor to any particular type of musical instrument to be used in my player instrument.

Instead of the normal way of supplying the air by the mouth, I may use some other means, such as compressed air, or the exhaust from an engine, or I may use a blower driven by some power such as an electric or other motive power; and instead of turning the notes controlling means by hand, I may use some other power.

It will be seen that the musical instrument is adjustably as well as detachably mounted in my player instrument, but I may permanently secure the musical instrument in my player instrument.

I claim:—

1. In a player instrument, means within which a musical instrument may be carried, a roller carrying support mounted on the outside of said means, and a tracker bar through which air may be delivered to the musical instrument.

2. In a player instrument, means within which a musical instrument may be detachably carried, a roller carrying support mounted on the outside of said means, and a tracker bar through which air may be delivered to the musical instrument.

3. In a player instrument, means open at one end, within which a musical instrument may be carried, a roller carrying support mounted on the outside of said means, and a tracker bar through which air may be delivered to the musical instrument.

4. In a player instrument, means open at opposite ends, within which a musical instrument may be carried, a roller carrying support mounted on the outside of said means, and a tracker bar through which air may be delivered to the musical instrument.

5. In a player instrument, means within which a musical instrument may be carried, and including a tracker bar, and a roller on each side of said carrying means, to move a notes sheet over the outside of said tracker bar.

6. In a player instrument, holding means including an arc-shaped portion, a musical instrument having a mouthpiece held within the arc, with its mouthpiece in proximity thereto, said arc-shaped portion being perforated to form a tracker bar, a notes sheet roller located on each side of the musical instrument whereby a notes sheet may be extended from roller to roller and over the tracker bar.

7. In a player instrument, means open at its ends for carrying a musical instrument having a mouthpiece and means to pass a notes sheet past the mouthpiece of said instrument.

8. In a player instrument, means open at its ends for carrying a musical instrument having a mouthpiece, and a tracker bar in proximity to the mouthpiece of said instrument.

9. In a player instrument, means open at its end for carrying a musical instrument having a mouthpiece, a tracker bar in proximity to the mouthpiece of said instrument, and means to move a notes sheet over said tracker bar.

10. In a player instrument, means open at each end for carrying a harmonica, said means including a tracker bar integral therewith.

11. In a player instrument, means open at each end for carrying a harmonica, said means including a tracker bar integral therewith on the harmonica side of the tracker bar.

12. In a player instrument, means comprising sheet material for carrying a mouth blown musical instrument, said means including a tracker bar and integral supports adjacent each end of the tracker bar for carrying a pair of rollers.

13. In a player instrument, means comprising sheet material for carrying a mouth blown musical instrument, said means including a tracker bar, integral supports adjacent each end of the tracker bar for carrying a pair of rollers, and a mouth piece through which air may be introduced to the musical instrument.

14. In a player instrument, means within which a musical instrument may be located having an arc-shaped wall, a musical instrument secured within the arc, said means including a perforated tracker bar, a notes sheet roller located on each side of the musical instrument, means to rotate the rollers, whereby a notes sheet may be passed from one roller over the tracker bar and to the other roller, and a mouth piece on the sheet side of the tracker bar.

15. In a player instrument, means within which a musical instrument may be located having an arc-shaped wall, a musical instrument secured within the arc, said means including a perforated tracker bar, a notes sheet roller located on each side of the musical instrument, means to rotate the rollers whereby a notes sheet passing from one roller over the tracker bar and to the other roller, means for pressing the sheet against the tracker bar, and a mouth piece on the sheet side of the tracker bar.

16. In a player instrument, a tracker bar, means to move a notes sheet over the tracker bar and means to hold a harmonica for lengthwise adjustment and in proximity to the tracker bar.

17. In combination, means for holding a musical instrument, a musical instrument held thereby and having a mouthpiece, a notes sheet roller supported at each side of the musical instrument, a tracker bar in proximity to the mouthpiece of the musical instrument, whereby a notes sheet may be passed from one roller to the other and over the outside of the tracker bar.

In testimony whereof I affix my signature.

JOSEPH LE ROY BANKS.